United States Patent [19]

Flanagan

[11] 4,106,068
[45] Aug. 8, 1978

[54] PRESSURE SENSITIVE INTERRUPTER

[75] Inventor: Robert J. Flanagan, Hudson Falls, N.Y.

[73] Assignee: General Electric Company, Hudson Falls, N.Y.

[21] Appl. No.: 763,091

[22] Filed: Jan. 27, 1977

[51] Int. Cl.² .............................................. H02H 7/16
[52] U.S. Cl. ...................................... 361/15; 361/272; 361/275
[58] Field of Search .................. 361/15, 16, 17, 37, 361/38, 105, 275, 274, 272; 200/83 R, 83 W

[56] References Cited

U.S. PATENT DOCUMENTS

| 3,248,617 | 4/1966 | Hynes et al. ...................... 361/275 X |
| 3,304,473 | 2/1967 | Netherwood et al. ........... 361/275 X |
| 3,377,510 | 4/1968 | Rayno ..................................... 361/15 |

OTHER PUBLICATIONS

"Safety Device for Low Voltage MP Type Power Capacitors," National Technical Report, vol. 18, No. 5, Oct. 1972, 361-15, Misaki et al.

Primary Examiner—Patrick R. Salce
Attorney, Agent, or Firm—James J. Lichiello

[57] ABSTRACT

This invention relates to a circuit interrupter for an electrical capacitor wherein internal pressure conditions cause a bulging of the capacitor cover and the bulging cover is utilized to break a plurality of electrical tab connectors.

5 Claims, 6 Drawing Figures

U.S. Patent     Aug. 8, 1978     4,106,068
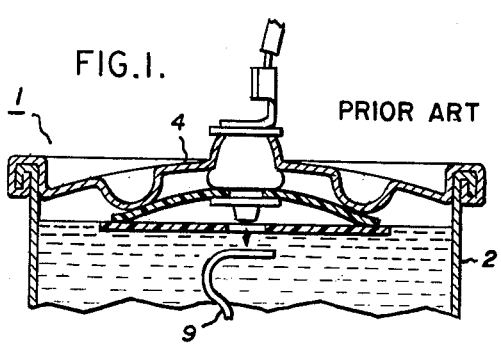
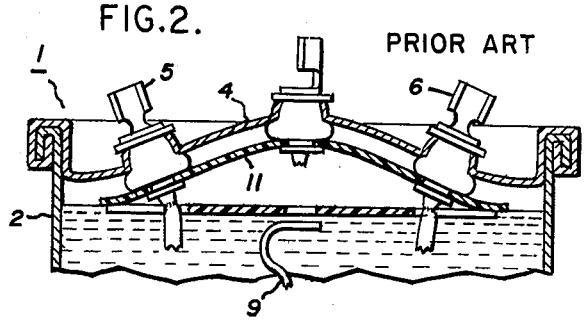
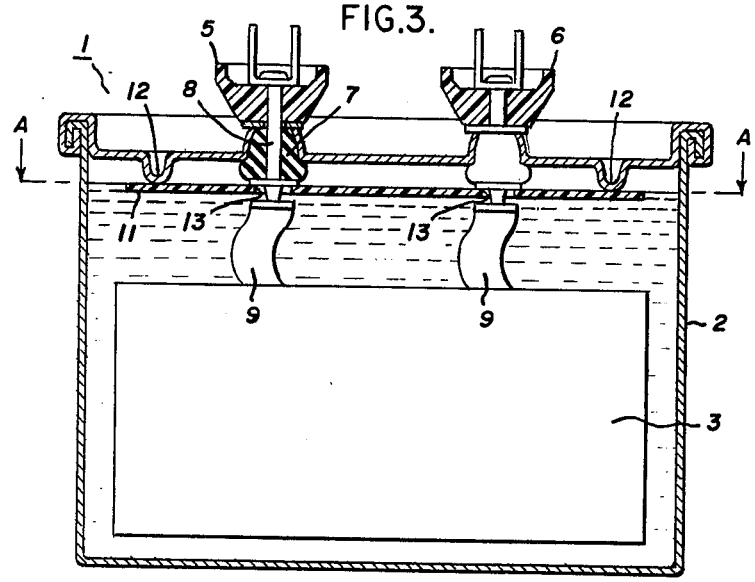
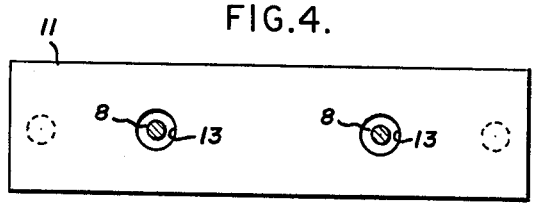
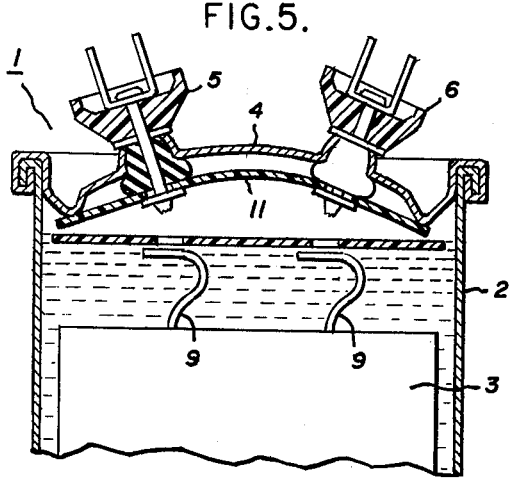
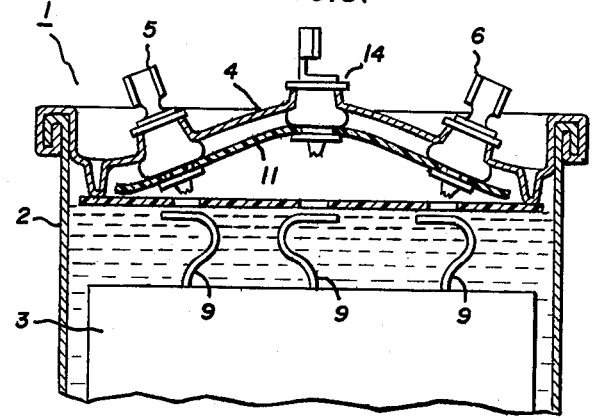

PRESSURE SENSITIVE INTERRUPTER

This invention relates to an improved pressure sensitive interrupter for electrical capacitors and is an improvement over the invention as disclosed in U.S. Pat. No. 3,377,510, Rayno, assigned to the same assignee as the present invention.

In a typical capacitor, a capacitor roll section is assembled in a metal can having a metal cover sealed thereto. Electrical capacitor leads pass from the capacitor roll section in the can through the cover. In such a capacitor, failures result from internal arcing and thermal runaway cause a pressure build-up in the capacitor can. This pressure build-up causes an outward bulging of the cover to such an extent that the case or can can rupture with the result of fluid spillage from the can. Where the fluid in the capacitor is flammable, a potential fire hazard results.

In the Rayno patent, there is disclosed a pressure sensitive electrical circuit interrupter device combined with an electrical capacitor. The Rayno device utilizes the bulging action of the cover to flex a bridge member which is supported independently of the cover under the cover. The bridge member served as a local connection for a terminal stud extending through the cover and bridge member, and a tab rising from the capacitor section to join to the stud at the bridge member. Accordingly, during the bulging of the cover the flexible bridge member, by means of the terminal and tab connection, flexes the bridge member until it is under sufficient flexing tension to break the connection which connects the capacitor tab to the terminal thereby interrupting the capacitor circuit through the tab.

It is now desirable to have maximum assurance that the capacitor is electrically removed from the circuit. Since the Rayno device served only to break one capacitor tab connection, the other tab remained connected to the electrical circuit. Under these conditions it is possible to have a short circuit from the capacitor tabs to the can with the attendant danger of remaking the capacitor circuit through the can. On the other hand once the capacitor has been removed from the circuit and begins to cool the internal pressure in the capacitor can subsides and the bulging cover may return towards its initial position. Under these conditions an arc may be struck between the interrupted connection in the capacitor tab and the capacitor reenergized with attendant danger of arcing and fire hazards. Accordingly, it is a principle object of this invention to adapt the bulging cover concept of the Rayno device to provide separation of a plurality of tabs or leads of an electrical capacitor.

SUMMARY OF THE INVENTION

In the practice of one form of this invention, each of a pair of spaced terminals of a two terminal capacitor has an electrical stud which projects through an insulating bridge member positioned at the underside of a capacitor cover. The bridge member spans a pair of indentations in the cover which serve as fulcrum points or spaced supports for the bridge member. The pair of capacitor terminal studs extend through the cover member and through a pair of spaced apart apertures in the bridge member between the fulcrum points. The terminals are positioned along a straight line joining the indentations and are spaced on opposite sides of the center of the capacitor cover. Tab leads from the capacitor section project upwardly to the underside of the bridge member adjacent the apertures through which the terminal studs project. The tabs are joined by welding to the terminals at the underside of the bridge member in such a manner that the tabs are not free to pass through the aperture. When the cover bulges due to an internal pressure build-up condition, the terminals follow the movement of the cover and take up a position significantly axially spaced from the capacitor section in the can and slightly rotated with respect to the capacitor can since they are on the slope of the cover. At the same time a weld connection of the tab to the terminal causes the bulging cover to flex the bridge member in a direction to approximate the curve of the capacitor cover. The stresses in the weld connection are greatly increased because they must not only withstand the bulging of the cover but also the rocking or the rotation of the terminals. At a predetermined point in the operation this combined tension and rocking stress in the weld is sufficient to cause the weld to rupture and the bridge member then springs back into essentially a level position. Consequently as the bridge springs back into its level or unstressed position the space between the tabs and the studs are maintained in a wide position to provide safety against a remake of the circuit or a striking of an arc at the broken connection. At the same time both tabs of the capacitor are broken and the capacitor is wholly removed from the electrical circuit.

This invention will be better understood when taken in connection with the following description and the drawings in which:

FIG. 1 is a prior art illustration of a single terminal circuit interrupter of the Rayno patent.

FIG. 2 is a prior art illustration of a two terminal capacitor of the Rayno patent in which only one terminal circuit is broken.

FIG. 3 is a side elevational view of a two terminal circuit interrupter device of the present invention.

FIG. 4 is a plan view of a bridge member of the two terminal interrupter device of FIG. 3.

FIG. 5 is an elevational view of a capacitor showing the circuit interrupter device of FIG. 3 after it has functioned.

FIG. 6 is a side elevational view of a three terminal circuit interrupter device of the present invention.

DESCRIPTION OF THE PREFERRED EMBODIMENTS

Referring now to FIGS. 1 through 3 there is shown an electrical capacitor 1 which may be any of the various types of capacitors utilized for fluorescent lighting ballasts, motor start, motor run, and other such capacitors. These capacitors may be either in a cylindrical can configuration, or, as is more common at the moment, in an oval or flattened can 2 configuration. A capacitor roll section 3 is positioned within the can 2 and submerged in a dielectric liquid impregnant. A cover member 4 having terminal assemblies 5 and 6 therein is sealed to the casing 1. The terminals 5 and 6 are similar and a description of one suffices for both. Each terminal assembly comprises a bushing member 7 made of a resilient material such as silicone rubber through which passes a conductive terminal stud 8 electrically connected at its inner end to a capacitor tab or lead such as tab 9. Prong connectors are joined to the external extremity of the stud 8 for external electrical connection to the capacitor.

In FIG. 1 the Rayno device was disclosed in connection with the breaking of an electrical circuit at only one terminal. Even with a two terminal design of FIG. 2 only one terminal circuit was broken. A three terminal design would still retain the single circuit break concept. One problem was that the underside of the terminals were used as supports on fulcrums, or, in a two terminal design, a dimple support at the location of the absent terminal was used as the fulcrum. Under these conditions the breaking of two or three terminal circuits was not feasible. The present invention involves the breaking of at least two terminal circuits because of the predetermined location of the terminals and the use of an improved support of the bridge member.

Referring now to FIGS. 3 and 4 a bridge member 11 is positioned adjacent the underside of the cover 4 and rests against a pair of oppositely positioned inwardly projecting supports or fulcrum members 12. In addition each terminal assembly is equidistently spaced from the center of the capacitor or cover.

Referring now to FIG. 4 there is illustrated a plan view of the bridge member 11 of the present invention. Bridge member 11 is made up of an insulating material for example a plastic material such as a phenolic resin or a resin paper laminate. As illustrated, the bridge member 11 is provided with a pair of spaced apertures 13 which lie directly under the terminals 5 and 6. Terminal studs 8 project through the bridge member in a close but loose fitting relationship with the apertures 13.

Referring again to FIG. 3 the tabs 9 from the capacitor roll section 2 project upwardly and lie underside the apertures 13 in the bridge member 11. At this point the studs 8 which have hemispherical shaped ends are welded to the tabs 9. The hemispherical ends provide a correct and constant weld connection with minimal variation between welds. As illustrated, the tabs 9 overlie the apertures 13 and are thus prevented from being drawn through the apertures 13 in conjunction with the ordinary tensions which are expected to take place.

The operation of this device progresses from FIGS. 3 to FIG. 5. Starting from the FIG. 3 device, upon overpressure conditions in Can 2 there is a pressure build-up which causes the cover 4 to commence bulging outwardly. As cover 4 commences bulging, the fulcrums 12 which engage the bridge 11 also begin to move outwardly but at a much lower rate and over less distance than the terminal assemblies 5 and 6. Consequently the bridge member 11 is being pulled or flexed upwardly by the terminal members 5 and 6 while the ends thereof are being restrained by the fulcrums 12. As the cover member 11 continues to move outwardly, the terminals 5 and 6 which are spaced from the center of the capacitor can also begin to rotate or rock slightly to follow the curvature of the cover. The attachment of the terminal studs 8 to the tabs 9 take place through a narrowly confining aperture 13. Accordingly the rocking action of the terminal may also add a bending or shear stress in the weld connection to accentuate the breaking of the connection. The rapid separation or breaking of the connection is facilitated by the use of a weld connection instead of a soldered connection.

The flexibility of the bridge member 11 also contributes to the rapid separation of the contacts. For example, a very stiff bridge member may lend sufficient restraining support to the cover so that a breaking of each of the contacts may not take place. Also, a low flexibility bridge member may provide a separation of the contacts so quickly that there will be no maximum separation of the contact members after the breakage occurs. In the alternative if the bridge member is too flexible, the contacts will remain unbroken at the maximum bulging of the cover or so near that point that the capacitor can may still rupture. With the terminals placed off center as is the case in this invention, and where the maximum distance of travel of a terminal of a bulging cover is limited as compared to a terminal in the center of a bulging cover, a quicker break with maximum separation is needed. Consequently by placing the terminals equidistently off center and correlating the weld connection with the flexibility of the bridge, contact separation and maximum separation of both terminal connections may be provided.

It has also been discovered that this invention is applicable to break the leads for three terminals as well as for two terminals without any additional design criteria. With the three terminal configuration as illustrated in FIG. 6, terminal 14 is positioned in the center of the cover and terminals 5 and 6 are positioned equidistently on opposite sides thereof. Under these conditions, when the cover 4 bulges, the central terminal 14 is the one that rises first and progresses through the greatest distance. The central terminal 14 will then have flexed the bridge sufficiently to break the tab connection before the tab connection breaks at the outer terminals. However, when the tab connection of the central terminal 14 breaks, the entire flexing stress must then be carried by the two outer terminals 5 and 6. This additional stress placed on the two center terminals caused them to break rather simultaneously. Accordingly it can be seen that the same design criteria and the same flexible stresses involved in the two terminal capacitor can be utilized to break a three terminal capacitor. In the three terminal capacitor, however, the breakage sequence is first the central terminal break followed in rapid succession by a near simultaneous breaking of the tabs for the outer terminals.

In one preferred form of this invention the capacitor as illustrated is described as an oval cross section capacitor with the longer dimension being about 1.75 inches and the width dimension being about 2.75 inches. The cover and the case may be either of steel or aluminum and with a steel cover the thickness is from about 0.012 to 0.016 inches and with aluminum it is from about 0.020 to 0.025 inches. The bridge member is a phenolic resin strip from about 2.5 to 2.9 inches in length and from about 0.8 to 0.10 inches in width and from about 0.060 to 0.064 inches thick. The fulcrum members are spaced close to the outer extremity of the cover and the fulcrum members project downwardly from about 0.080 to 0.08 inches.

While this invention has been disclosed with respect to particular embodiments thereof, numerous modifications may be made by those skilled in the art without departing from its true spirit and scope. Therefore, it is intended that the appended claims cover all such modifications and variations which come within the true spirit and scope of the present invention.

What is claimed as new and desired to be secured by Letters Patent of the United States is:

1. An electrical capacitor comprising in combination,
   a. a capacitor can having a capacitor section sealed therein,
   b. a cover member sealingly attached to said can to seal said capacitor section therein in liquid tight relationship, c. a pair of terminal means in said cover and extending there through, said terminal means being spaced equidistantly on opposite sides of the center of said cover,
d. an electrical tab member for each of said terminals for connection of said tabs to said capacitor section,
e. a predeterminedly flexible insulating strip bridge member adjacent the underside of said cover,
f. a pair of fulcrum members adjacent the outer extremity of said cover member and restraining said bridge member from upward movement,
g. said bridge member extending across said fulcrum members and having a pair of apertures therethrough in alignment with the terminal means,
h. a stud member in said terminal members extending through said apertures,
i. a pair of tab members electrically connected to said capacitor section and extending up to said bridge member at said apertures,
j. each said tab being formed to prevent axial movement thereof through its said aperture,
k. a welded electrical shear connection joining said tab members to said stud members below said bridge member,
l. said bridge member being characterised by having significant transverse flexibility between said fulcrums so that when said cover member bulges due to increased pressure in said casing, the resulting movement of said terminals and their connection to said tabs flexes the bridge member in the direction of the bulging of the cover until a predetermined stress is encountered in said shear connections and such connections are broken and the bridge member returns to its unflexed condition.

2. The invention as recited in claim 1 wherein said can comprises an oval like cross section and said bridge member and terminals extend along the longer dimension thereof.

3. The invention as recited in claim 1 wherein said fulcrums are indentations in said cover member.

4. The invention as recited in claim 2 wherein three such terminals are located in said cover, one of said terminals being in the center of said cover and the other two terminals being equidistantly spaced on opposite sides thereof.

5. The invention as recited in claim 1 wherein said can comprises a circular cross section.

* * * * *